United States Patent [19]

Funke et al.

[11] Patent Number: 4,783,860
[45] Date of Patent: Nov. 15, 1988

[54] COMBINED FLAPPER AND PISTON MOTION WAVE BOARD MODULE

[75] Inventors: Edgar R. Funke; Michael Miles, both of Gloucester; Larry Corish, Nepean, all of Canada

[73] Assignee: Canadian Patents and Development Limited, Ottawa, Canada

[21] Appl. No.: 53,704

[22] Filed: May 26, 1987

[51] Int. Cl.$^4$ .................... E02B 3/00; A47K 3/10
[52] U.S. Cl. ........................... 4/491; 405/79; 73/148
[58] Field of Search .................. 4/491, 492, 494; 73/148; 405/79; 277/236

[56] References Cited

U.S. PATENT DOCUMENTS

| | | | |
|---|---|---|---|
| 490,484 | 1/1893 | Mackaye | 4/491 |
| 586,983 | 7/1897 | Wharton, Jr. | 4/491 |
| 1,181,406 | 5/1916 | Potter | 4/491 |
| 1,773,749 | 8/1930 | Peterson | 277/236 |
| 3,161,350 | 12/1964 | Lorcher | 277/198 |
| 3,557,559 | 1/1971 | Barr | 4/491 |
| 3,562,823 | 2/1971 | Koster | 4/491 |
| 3,973,405 | 8/1976 | Duport | 4/491 |
| 4,062,192 | 12/1977 | Biewer | 4/491 |
| 4,201,496 | 5/1980 | Andersen | 405/79 |
| 4,229,969 | 10/1980 | Hark | 73/148 |
| 4,406,162 | 9/1983 | Hark | 73/148 |
| 4,507,018 | 3/1985 | Andersen | 405/79 |
| 4,587,841 | 5/1986 | Giovachini et al. | 73/148 |
| 4,660,805 | 4/1987 | Hahn et al. | 277/236 |

OTHER PUBLICATIONS

Davis Engineering Project Profile, Serpentine Wave Generator, Jul. 1983.
Hydraulics and Pneumatics, Ideas and Applications, Jun., 1986.

Primary Examiner—Henry J. Recla
Attorney, Agent, or Firm—Burns, Doane, Swecker & Mathis

[57] ABSTRACT

There is described a wet back device for generating waves in a liquid in a test tank or the like. Such devices are known and usually operate a wave generating board by a push-pull piston operation or a flapping wave generating board pivoted in the tank and rocked about a horizontal axis to move water in the tank and create waves therein. The device described is capable of producing the push-pull generated wave motion or the flapper type motion, or a combination of those motions and is provided with seals between the wave generating board and the tank walls or between individual wave generating boards (in a multiple board arrangement) and the walls of the tank. Closure plates are provided on the support frames for the boards. Gliding surfaces are provided to ensure reliable action and frame members are located to provide energy loss in fast flowing water in the tank.

20 Claims, 7 Drawing Sheets

COMBINED FLAPPER AND PISTON MOTION WAVE BOARD MODULE

BACKGROUND OF THE INVENTION

The present invention relates to a device for generating wave motion in a water test tank or the like by moving a wave generating board in the tank and specifically to a device of the wet back type, where water circulates at the back, as well as at the front of the wave generating board. Such devices are traditionally used to produce wave formations to scale to study the action of the waves on harbour installations, sand bars, the motions of vessels, the forces on structures, or such like.

It is well known, for example see U.S. Pat. No. 3,557,559, to generate waves in a test tank by reciprocating a planar wave board in a to and fro, linear fashion parallel to the plane of the water level in the tank. It is also well known to create surface waves in a body of liquid, see U.S. Pat. No. 4,406,162 by flapping a wave board in a tank by rocking it about a horizontal pivot point.

Devices are also known which in addition to being capable of operating in either of the fashions described above, are also capable of operating in a combined fashion, that is to say a fashion where the movement of the wave board is part linearly reciprocal and part pivotal.

In wet back type devices when the wave height is a maximum in front of the wave generating board, it is a minimum behind the wave generating board. This causes water jets to be propelled through the gaps between the wave boards. These are known to cause undesirable disturbances in the waves.

STATEMENT OF THE INVENTION

According to the present invention there is provided a device for generating wave motion in a water tank comprising a base frame operationally fixed relative to the tank, a main frame on the base frame, a glider frame mounted on the main frame for linear reciprocation in t he tank parallel to the tank water level plane, a wave generating board mounted on the glider frame for linear movement therewith and pivotally connected at its lower end thereto for pivotal motion thereon, actuator lever means pivotally connected to the main frame for oscillation thereon; connecting link means between the wave generating board and the actuator lever means; second connecting link means connected at a fixed end to the glider frame and having a second end adapted for connection to a plurality of positions on the actuator lever means and the main frame, whereby to vary the geometry of the actuator lever means, second connecting link means and glider frame connections to produce, on actuation, movement of the wave generating board means which is one of:

(a) linear with the glider frame;
(b) part linear with said guide means and part pivotal about its pivotal connections on and relative to the moving glider frame means; and
(c) pivotal about its pivotal connections on and relative to a stationary glider frame means, and sealing means on at least one side face of said wave generating board and extending normal to the tank water level plane substantially throughout the extent of the depth of the side face.

According to one aspect of the invention a plurality of glider frames, wave generating boards, actuator lever means and connecting link means are mounted side-by-side on the main frame to provide a bank of individually operated wave generating boards, sealing means are provided on at least one side face of each wave generating board to close the gap between it and the side face of the next adjacent wave generating board and sealing means are provided between the external side faces of the external wave generating boards and an adjacent surface of the tank.

According to a preferred form of the invention the sealing means comprises a sheet of flexible material clamped to the side face of the wave generating board along a front edge and along a back edge of the sheet whereby to cause the sheet to buckle away from the side face of the wave generating board by an amount somewhat greater than a gap width between the side face of the wave generating board and its adjacent face, or surface.

In one embodiment the device may have means to lift the main frame relative to the base frame in the tank or to lift the main frame and the base frame relative to the tank. A difficulty arises in operating a wave generating machine in a raised position in the tank in that the wave in front of the wave generating board will tend to force recirculation of water under the board to balance out the head difference between the front and the back. This causes serious loss of wave height.

According to one preferred embodiment of the device the main frame has closure plate means to close the bottom and back of the main frame. Alternatively, closure plate means may be provided to close the bottom of the main frame and the back of the base frame depending upon the nature of the manner in which the frames are raised.

It is a feature of the invention that the structural members constituting the main frame, base frame and glider frames are operationally located to provide energy loss in fast flowing water. The structural members being largely sharp edged.

In one feature of the present invention, gliding surfaces are provided on an upper part of the main frame and glider pad means are located at the top of each wave generating board and are adapted to engage the surfaces.

According to another feature of the invention, glider pad means are located at the top of each wave generating board and engage surfaces on the upper part of its related glider frame. Additionally, torsion restraining pad means may be provided on the top of each wave generating board.

According to a further feature of the present invention a quick disconnect coupling is provided between the second end of the second connecting link and the actuator lever means and the main frame, which coupling includes a mating tapered plug and cup.

DESCRIPTION OF THE DRAWINGS

The following is a description by way of example of a preferred embodiment of the present invention reference being had to the accompanying drawings in which.

DESCRIPTION OF THE PREFERRED EMBODIMENTS

Figure 1:
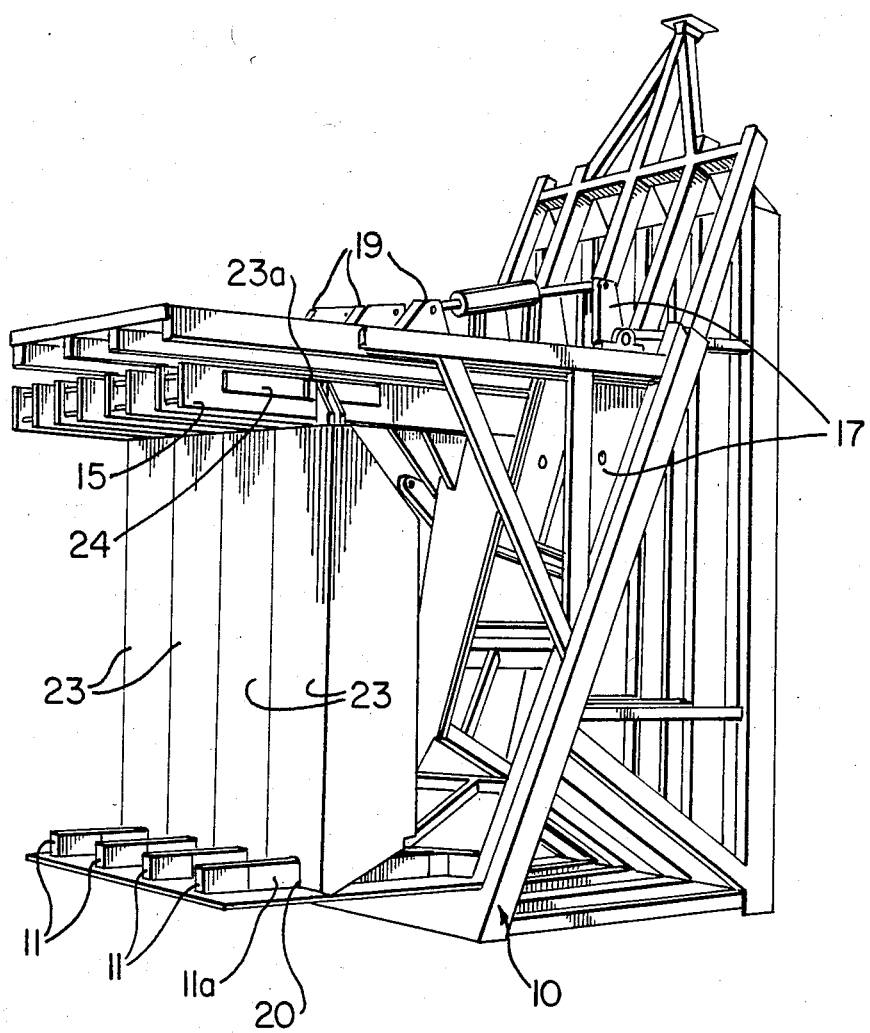
FIG. 1 is a perspective view of a wave generating apparatus.

Turning now to the drawings, a base frame 10 has one or a plurality of parallel main frames 10a to each of which is attached one or two upper parallel guides 12 and which may also be provided with one or more base guides 11, the upper guides and base guides accommodate a glider frame 15 for linear to and fro reciprocation thereon. Pivotally mounted at 16 are one or a plurality of actuator levers 17 one for each glider frame. Each actuator lever incorporates an individually operated hydraulic, electric, pneumatic or like actuator 18 which is attached at 19 to the main frame 10a and to the upper end 16a or to an appropriate alternate lower lever point 16b of the actuator lever 17 (alternate actuation can be by motion of cable systems, chain or gears, etc.).

Figure 3:
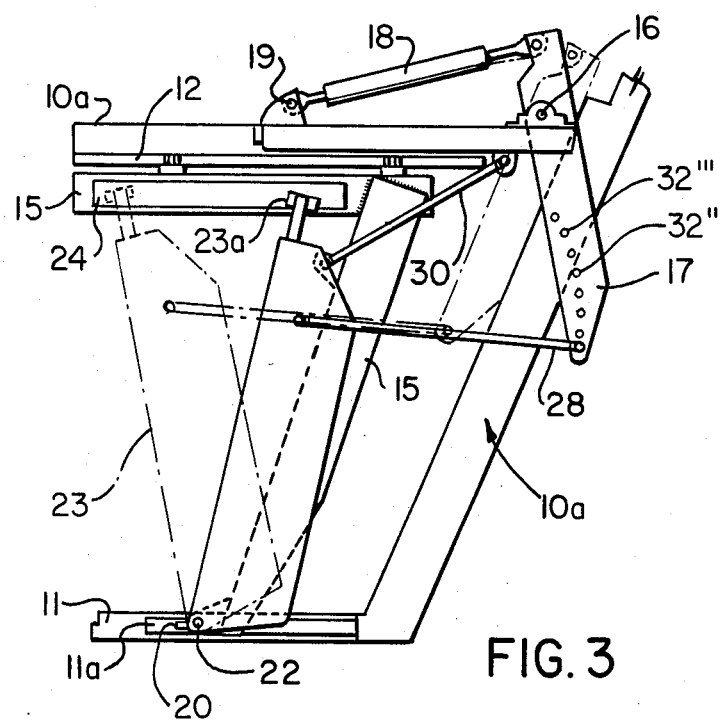
FIG. 3 illustrates the operation of the device in the mode shown in FIG. 2A', that is the "flapper" or pivotal mode.
Figure 10:
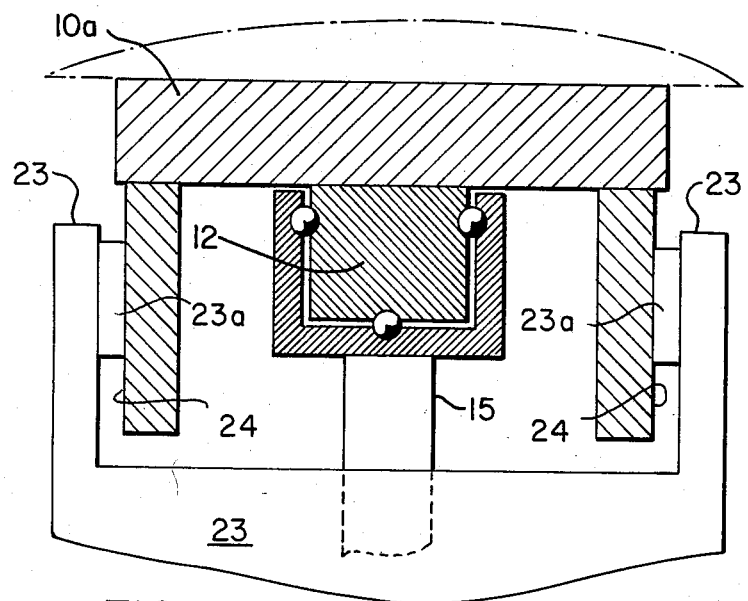
FIG. 10 is a detail of the gliding connection of the glider frame, wave generating board and main frame.

Pivotally mounted at 22 to the lower end of the glider frame 15 is a wave generating board 23, one for each glider frame, as best seen in FIG. 3. The glider frames may have bearing pads 20 on their lower end so that they may run on the base guide gliding surfaces 11a and thereby be constrained from lateral motion in a direction normal to the reciprocating motion of the glider frame. The upper parallel guides 12 restrict the motion of the glider frame 15 to a linear horizontal motion. The wave generating boards are provided with upper bearing pads 23a which may run on gliding surfaces 24 attached either to the main frame 10a (FIGS. 7 and S) or the glider frame 15 (FIGS. 1, 3, 4 and 5) for restraining the motion of the upper end of the wave generating board 23 to be parallel to the glider frame 15 (see also FIG. 10).

Figure 2:
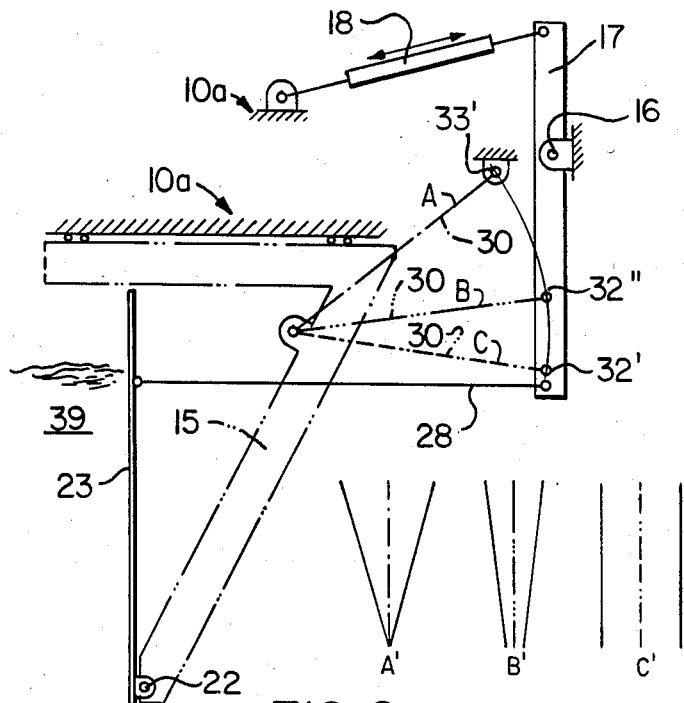
FIG. 2 is a diagram showing the geometric relationship between the individual elements, and FIGS. 2A', B' and C' show the individual motions of the wave board.

A first connecting link 28 connects the wave generating board 23 to the lower end of the actuator lever 17 (see particularly FIG. 2). A second connecting link 30 is connected at one end to the glider frame 15 and at its other end to one of a plurality of positions 32', 32" on the lower section of the actuator lever 17, or it may be connected at 33' on the main frame 10a.

As best seen in FIGS. 2 and 3, when the second link 30 is connected in the position A, the geometry of the wave generating board 23 glider frame 15, links 28 and 3 0 and actuating lever 17 is such that reciprocal operation of the actuator means 18 rocks the actuator lever 17 about its pivot 16 to cause the connecting link 28 to oscillate the wave generating board 23 about its pivot or hinge point 22, the glider frame 15 remaining stationary the while. This produces a flapping action, (illustrated in FIG. 2A') of the wave generating board 23.

Figure 4:
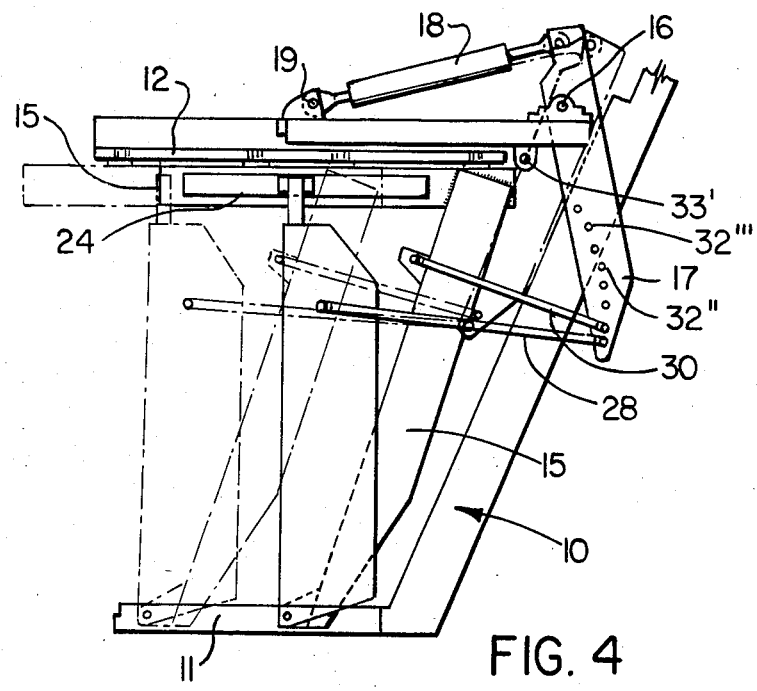
FIG. 4 shows the configuration of the device which produces the motion seen in FIG. 2C', that is the "piston" or linear reciprocation mode.

As best seen in FIG. 4, when the link 30 is connected near the lower end of the actuating lever 17, at the point 32', in the configuration C in FIG. 2, reciprocal operation of the actuator means l S again causes the rocking of the lever 17 about its pivot 16 but because of the geometry of the parts, the glider frame 15 is caused to linearly reciprocate on the guides 11 and 12 with the wave board 23 remaining stationary in its pivot 22 and upright and reciprocating on and together with the glider frame 15 (FIG. 2C').

Figure 5:
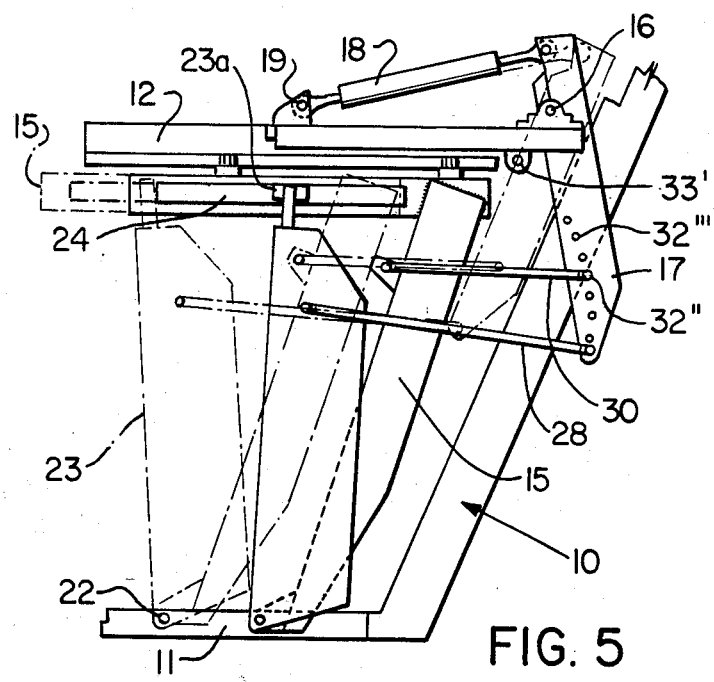
FIG. 5 shows the configuration which produces the motion shown in FIG. 2B', that is part reciprocal part pivotal mode.

As best seen in FIG. 5, when the link 30 is moved to the intermediate position, so that it connects at the point 32" on the actuating lever 17, that is the position B as seen in FIG. 2, a combination of linear reciprocation and pivoting motion is accomplished for the wave board 23, as illustrated in FIG. 2B'This is because the geometry of the parts is such that the glider frame makes a limited linear reciprocating travel on its guides and the wave board 23 makes a limited pivoting action about its pivot point 22 at the same time. The point 32" is selected to produce a prescribed wave motion in water 39 in the tank.

As seen in FIGS. 3, 4 and 5 a number of points 32", 32"', etc. may be provided for different geometric relationships to produce different wave motions in the tank. Clearly the link 30 could be attached in, say a cam groove or in any other desired fashion to produce an infinitely variable variety of relationships and so of wave forms, as desired.

Turning now to FIGS. 6a through 6d, because the machine is a wet back machine, where water in the tank is behind the wave generating boards as well as in front of them, when the wave height is a maximum in front of the wave generating board 23F, it is a minimum behind the wave generating board. This, in the absence of seals 50, would cause water jets to be propelled through the gaps 51 between adjacent side faces 23s of the wave generating boards and between the side face of the wave generating board and the side surface T of the tank. These water jets are known to cause undesirable disturbances in the waves.

Figure 6A:
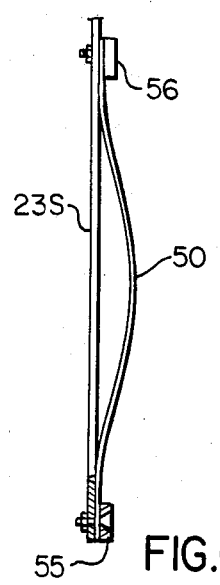
FIGS. 6a, 6b, 6c and 6d, shows details of the seal in accordance with the present invention.
Figure 6B:
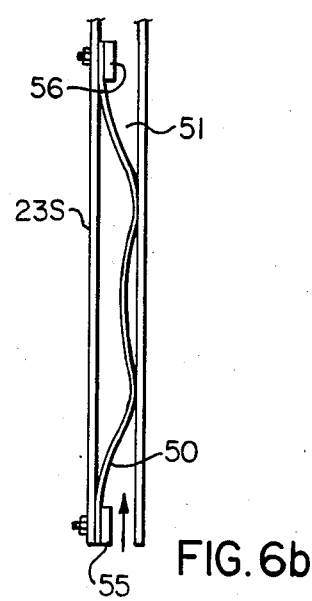
Figure 6C:
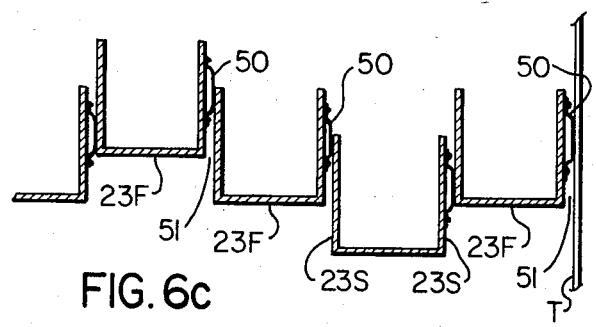
Figure 6D:
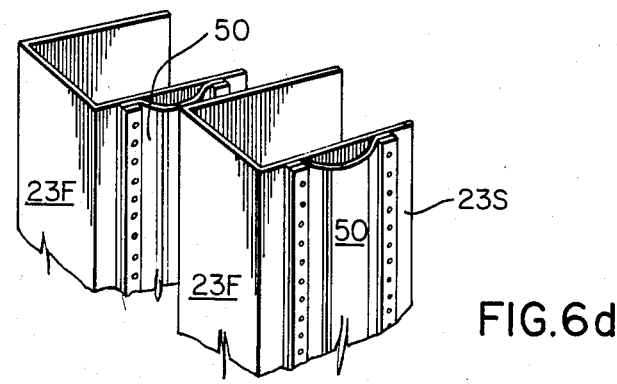

The jets are prevented by the provision of the buckled sheet seal 50 which is attached at one side (or perhaps at both sides) 23s of a wave board 23 and provides sealing between two adjacent wave boards or between the wave board and the side wall. The principle of the seal is that, as best seen in plan view in FIGS. 6a and 6b, a sheet of flexible material such as plastic (particularly teflon) or thin sheet foil is clamped to the side 23s of a wave generating board along the front edge 55 and the back edge 56 of the sheet. The clamping is done in such a manner, that the sheet buckles away from the wave board side 23s by an amount somewhat greater than the gap 51 between the wave board side and its adjacent surface. When the adjacent wave board is placed into position, as best shown in FIG. 6b, the sheet 50 will deflect while exerting pressure on the side of the wave board, thereby providing a seal between the two wave boards, or between the wave board and the tank side.

Figure 7:
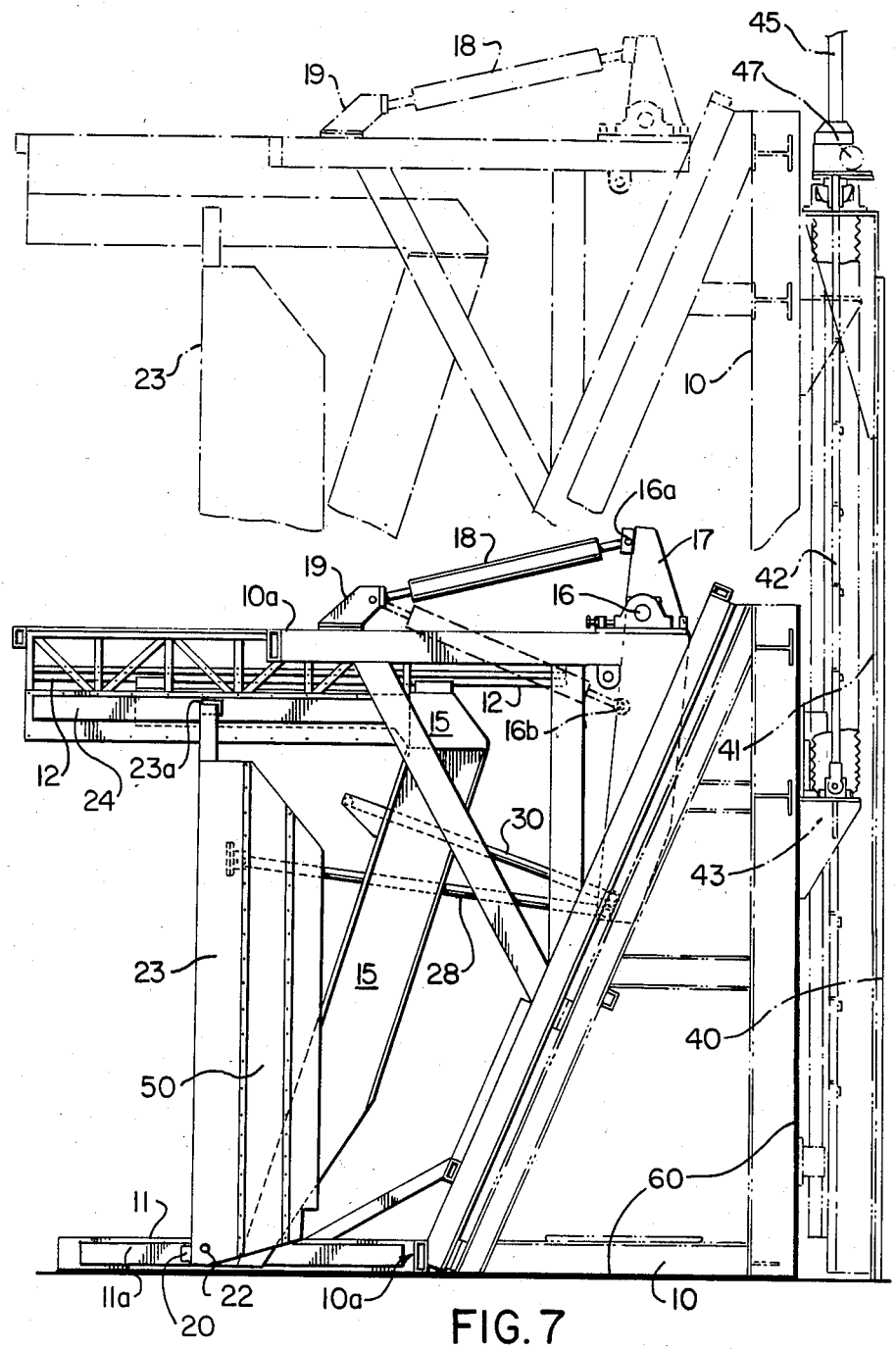
FIG. 7 is a side elevation showing one form of lifting frame connected to the base and main frame.
Figure 8:
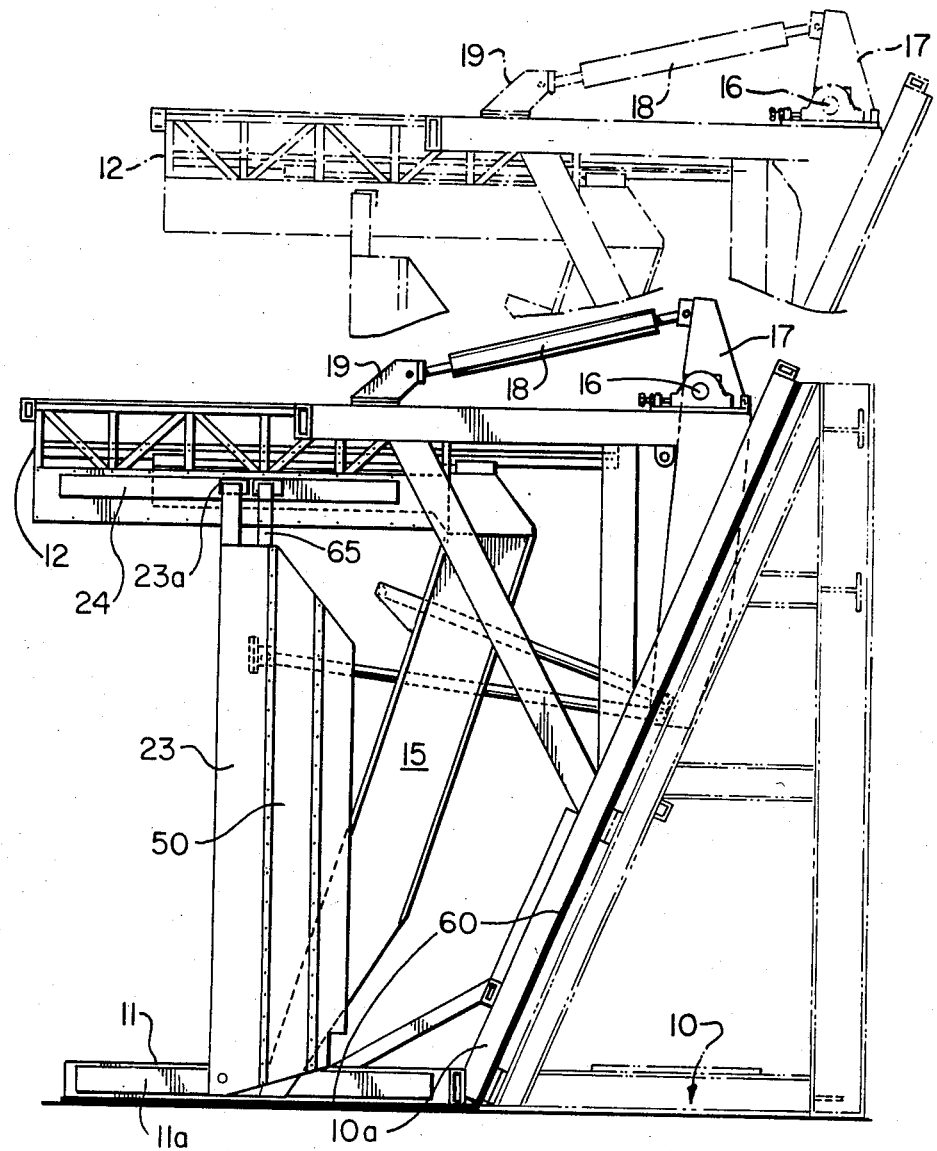
FIG. 8 shows an alternative configuration for lifting the wave generating machine in the tank.

As the differential pressure increases between the front and back of the wave boards, the hydrodynamic pressure on the seal 50 will be such that the pressure of the buckled sheet on the side of the wave board will be increased. Therefore the buckled sheet seal is self sealing. As best seen in FIGS. 7 and 8, the seals 50 extend vertically the full depth of the side face of the wave board, normal to the tank water level plane.

Turning now to FIG. 7 a lifting frame 40 is positioned adjacent to the base frame 10 and fixed relative to the tank. The lifting frame 40 includes upright structural members 41. The lifting rods 42 are connected at 43 to the main frame 10 and are driven by motors 45 through, say, worm and pinion gears 47. Actuation of the motors 45 cause the rods 42 to move and to lift, through the connections 43, the base frame 10 with the main frame 10a thereon, its glider frames and wave generating boards, up and down within the tank to adjust the position of the wave generating boards 23 relative to the water surface in the tank and to the tank bottom, thereby providing for a greater variety and better quality of wave characteristics producible by the wave boards. The elevating of the wave machine in the tank creates a problem that in its raised position the wave in front of the board tends to force recirculation of water under the board to balance out the head difference between the front and back of the board. This causes serious loss of wave height. To overcome this problem closure plates 60 are provided along the bottom of the main and base frame and upwardly behind the base frame (see FIG. 7).

FIG. 8 shows an alternative arrangement in which lifting of the wave machine is obtained by moving the main frame 10a upwardly relative to the base frame 10 and reconnecting it to the base frame 10 at the desired height (see FIG. 8). Here closure plates 60 close the bottom and back of the main frame 10a.

Any suitable means can be provided to lift the frame 10a relative to the base frame 10. For example, an overhead crane could be utilized.

In both embodiments the structural members constituting the main frame 10a, the base frame 10, the glider frame 15 etc. are generally sharp edged and are operationally located to provide energy loss in fast flowing water. To avoid torsional stresses in the wave boards additional torsion pads 65 (as can be seen in FIG. 8) may be provided.

Figure 9:
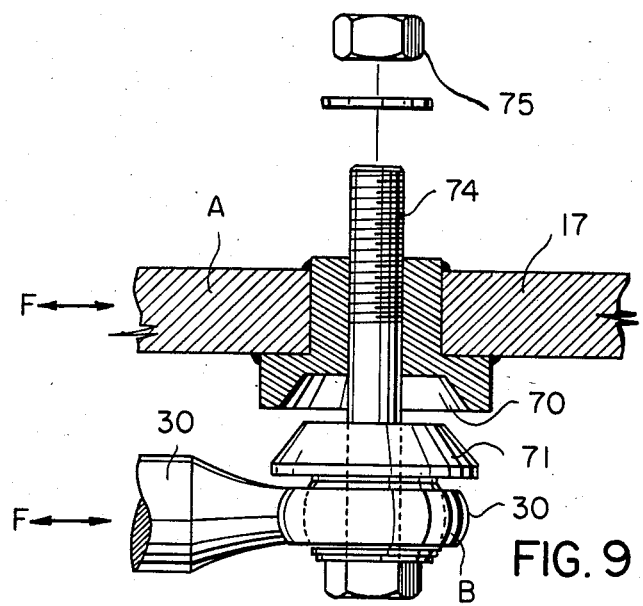
FIG. 9 is a detail of a quick disconnect device.

Referring now to FIG. 9. This shows a "quick disconnect" coupling. This coupling solves the basic problem in machine applications where load F is to be transferred in a reciprocating manner from machine part B (in this embodiment the second link 30) to machine part A (in this example the actuator lever 17). In these circumstances what is required is a coupling which does not need a press fit connection or an expensive clevis (to make the joint) but is easily connectable and can still transmit large oscillating loads by shear. The cup 70 and plug 71 arrangement provides this feature. In the arrangement shown the plug 71 is separately press fit into rod end 30 and the cup 70 may be separately press fit or welded into actuator lever 17. The bolt 74 is tightened down and kept under tension by spring washers and nut 75. Shear loads are transmitted through the mating tapers of the cup 70 and the plug 71.

Although the device has been described with banks of wave generating boards 23 being arranged in side by side relation, it is to be understood that the invention is equally applicable to a single wave generating board 23 sealed from its tank at both sides.

The actuators 18 are preferably individually controlled from some suitable computer control to produce individual lengths of stroke and velocity of stroke to provide the desired wave patterns in the tank.

What we claim as our invention is:

1. A wet back device for generating wave motion in a water tank comprising a base frame operatively fixed relative to the tank, a main frame on said base frame, a glider frame mounted on the main frame for linear reciprocation in the tank parallel to a tank water level plane, a wave generating board mounted on said glider frame for linear movement therewith, and pivotally connected at its lower end thereto for pivotal motion thereon, said wave generating board having a front wave generating face and side faces, actuator lever means pivotally connected to the main frame for oscillation thereon; first connecting link means between said wave generating board and said actuator lever means; second connecting link means connected at a pivotally fixed end to said glider frame and having a second end connected to one of a plurality of positions on said actuator lever means or to said main frame, whereby to vary the geometry, of said actuator lever means, by connecting said second end of said second connecting link means to one of said positions produces, on actuation, movement of the wave generating board means which is one of:

(a) linear with the glider frame;
(b) part linear with said glider frame and part pivotal about its pivotal connections on and relative to the moving glider frame means; and
(c) pivotal about its pivotal connections on and relative to a stationary glider frame means, and sealing means on at least one side face of said wave generating board and extending normal to the tank water level plane substantially throughout the extent of the depth of said side face to provide a seal between said side face and an adjacent surface.

2. A device as claimed in claim 1 in which said sealing means comprises a sheet of flexible material clamped to said at least one side face along a front edge and along a back edge of said sheet whereby to cause said sheet to buckle away from said side face by an amount greater than a gap width between said side face and its adjacent face, or surface.

3. A device as claimed in claim 2, in which said main frame has closure plate means to close the bottom and back of the main frame.

4. A device as claimed in claim 3 in which means is provided to lift the main frame relative to said base frame.

5. A device as claimed in claim 2 in which closure plate means are provided to close the bottom of said main frame and the back of said base frame.

6. A device as claimed in claim 5 in which means is provided to lift said main frame and said base frame relative to said tank.

7. A device as claimed in claim 2, in which the structure members constituting the main frame, base in which gliding surfaces are provided on an upper part of said main frame and glider pad means are located at the top of each wave generating board and are adapted to engage said surfaces.

8. A device as claimed in claim 2, in which bearing pad means are located at the top of each wave generating board and engage glider surfaces on the upper part of main frame and glider pad means are located at the top of each wave generating board and are adapted to engage said surfaces.

9. A device as claimed in claim 8 in which base glider means are provided on said main frame on which said glider frame is adapted to reciprocate.

10. A device as claimed in claim 2, in which bearing pad means and torsion pad means are located at the top of each wave generating board and engage glider surfaces on the upper part of its related glider frame.

11. A device as claimed in claim 10 in which base glider means are provided on said main frame on which said glider frame is adapted to reciprocate.

12. A device as claimed in claim 2, in which gliding surfaces are provided on an upper part of said main frame and a glider pad means and torsion pad means are located at the top of each wave generating board and are adapted to engage said surfaces.

13. A device as claimed in claim 2, in which bearing pad and torsion pad means are located at the top of each wave generating board and engage glider surfaces on the upper part of its related glider frame.

14. A device as claimed in claim 2 in which a quick disconnect coupling is provided between said second end of said second connecting link and said actuator lever means and said main frame, which coupling includes a mating tapered plug and cup.

15. A device as claimed in claim 1 in which said plurality of positions on said actuator lever means and said main frame are preselected to provide specific geometric relationships between said actuator lever means, said connecting link means and said glider frame to produce prescribed wave patterns when actuated in a tank of water.

16. A wet back device for generating wave motion in a water tank comprising a base frame operatively fixed relative to the tank, a main frame on said base frame, a plurality of glider frames mounted on the main frame in side by side relation for individual linear reciprocation in the tank parallel to the tank water level plane, a wave generating board mounted on each glider frame for linear movement therewith and pivotally connected at its lower end thereto for pivotal motion thereon, said wave generating board having a front wave generating face and two side faces extending rearwardly therefrom, a plurality of actuator lever means, one for each glider frame, pivotally connected to the main frame for oscillation thereon; first connecting link means extending between and pivotally connected to each wave generating board and its associated actuator lever means; second connecting link means connected at a pivotally fixed end to each glider frame and having a second end connected to one of a plurality of positions on its associated actuator lever means or to said main frame, whereby to vary the geometry of each actuator lever means by connecting said second end of said second connector link means to one of said positions produces, on actuation, movement of each wave generating board means which is one of:
(a) linear with its glider frame;
(b) part linear with its glider frame and part pivotal about its pivotal connections on and relative to its moving glider frame means; and 17. A device as claimed in claim 16 in which said sealing means comprises a sheet of flexible material clamped to said at least one side face along a front edge and along a back edge of said sheet whereby to cause said sheet to buckle away from said side face by an amount greater than a gap width between said side face and its adjacent face, or surface.

18. A device as claimed in claim 17 in which said main frame has closure plate means to close the bottom and back of said main frame.

19. A device as claimed in claim 18 in which means is provided to lift the main frame relative to said base frame.

20. A device as claimed in claim 2 in which said plurality of positions on said actuator lever means and said main frame are preselected to provide specific geometric relationships between said actuator lever means, said connecting link means and said glider frame to produce prescribed wave patterns when actuated in a tank of water.

* * * * *